United States Patent
Cheng

(10) Patent No.: US 12,282,620 B2
(45) Date of Patent: Apr. 22, 2025

(54) TOUCH DISPLAY DRIVING CIRCUIT

(71) Applicant: SITRONIX TECHNOLOGY CORP., Jhubei (TW)

(72) Inventor: Chia-Chi Cheng, Jhubei (TW)

(73) Assignee: Xmyth IP Group Limited, Apia (WS)

( * ) Notice: Subject to any disclaimer, the term of this patent is extended or adjusted under 35 U.S.C. 154(b) by 0 days.

(21) Appl. No.: 16/037,296

(22) Filed: Jul. 17, 2018

(65) Prior Publication Data

US 2019/0018542 A1 Jan. 17, 2019

Related U.S. Application Data

(60) Provisional application No. 62/533,199, filed on Jul. 17, 2017.

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/044* (2013.01)

(58) Field of Classification Search
CPC ...... G06F 3/0412; G06F 3/0416; G06F 3/044; G06F 3/0418; G09G 3/3688; G09G 3/3677
See application file for complete search history.

(56) References Cited

U.S. PATENT DOCUMENTS

| | | | | |
|---|---|---|---|---|
| 9,164,641 B1 * | 10/2015 | Rowe | ...................... | G06F 3/044 |
| 9,377,919 B1 * | 6/2016 | Kang | ................... | G09G 3/3696 |
| 10,424,262 B2 * | 9/2019 | Igawa | ................... | G09G 3/3688 |

(Continued)

FOREIGN PATENT DOCUMENTS

| | | |
|---|---|---|
| CN | 1929016 A | 3/2007 |
| CN | 101587688 A | 11/2009 |

(Continued)

OTHER PUBLICATIONS

Search Report Issued by a Foreign Patent Office.
(Continued)

*Primary Examiner* — Sepehr Azari
(74) *Attorney, Agent, or Firm* — Rosenberg, Klein & Lee

(57) ABSTRACT

The present invention discloses a touch display driving circuit, which generates a plurality of scan signals and a plurality of source signals for driving a touch display panel to display images. The touch display driving circuit further comprises a touch detection circuit and one or more current-source. The touch detection circuit detects a plurality of sensing signals of the touch display panel in a touch detection cycle for detecting touches on the touch display panel. The one or more current-source outputs one or more current signal in the touch detection cycle for maintaining the average values of the levels of the plurality of scan signals or the average values of the levels of the plurality of source signal at a predetermined level and maintaining the display electrodes of the touch display panel floating. Thereby, in the touch detection cycle, the parasitic capacitance effect (Continued)

between the touch electrodes and the display electrodes of the touch display panel can be reduced and thus enhancing the touch sensitivity thereof.

11 Claims, 5 Drawing Sheets

(56) References Cited

U.S. PATENT DOCUMENTS

| | | | | |
|---|---|---|---|---|
| 2011/0267295 | A1* | 11/2011 | Noguchi | G06F 3/0416 |
| | | | | 345/173 |
| 2014/0292700 | A1* | 10/2014 | Mizuhashi | G06F 3/044 |
| | | | | 345/173 |
| 2015/0091843 | A1* | 4/2015 | Ludden | G06F 3/044 |
| | | | | 345/174 |
| 2015/0177880 | A1* | 6/2015 | Shin | G06F 3/0412 |
| | | | | 345/174 |
| 2016/0109992 | A1* | 4/2016 | Hung | G06F 3/0412 |
| | | | | 345/174 |
| 2016/0334934 | A1* | 11/2016 | Mo | G02F 1/13338 |
| 2017/0090615 | A1* | 3/2017 | Bohannon | G06F 3/044 |
| 2017/0256225 | A1* | 9/2017 | Igawa | G09G 3/3677 |
| 2017/0315646 | A1* | 11/2017 | Roziere | G02F 1/13338 |
| 2018/0173359 | A1* | 6/2018 | Ji | G02F 1/1333 |

FOREIGN PATENT DOCUMENTS

| | | |
|---|---|---|
| CN | 103698927 A | 4/2014 |
| CN | 104076996 A | 10/2014 |
| CN | 104424903 A | 3/2015 |
| JP | 2012203901 A | 10/2012 |
| JP | 2014505298 A | 2/2014 |
| JP | 2016009485 A | 1/2016 |
| KR | 20120108704 A | 10/2012 |
| TW | 201205402 A1 | 2/2012 |
| TW | 201211970 A1 | 3/2012 |
| TW | 201319891 A1 | 5/2013 |
| TW | 201340061 A | 10/2013 |
| WO | 2013043337 A1 | 3/2013 |

OTHER PUBLICATIONS

Office Action issued on Feb. 20, 2021 for corresponding CN Patent Application 201810783921.8.
International Official Action issued on Nov. 9, 2021 for corresponding Patent Application 201810783921.8.

* cited by examiner

TOUCH DISPLAY DRIVING CIRCUIT

FIELD OF THE INVENTION

The present invention relates generally to a touch display driving circuit, and particularly to a touch display driving circuit capable of reducing parasitic capacitance interference and power consumption.

BACKGROUND OF THE INVENTION

Due to the rapid development of handheld devices such as smartphones or tablet computers, the human-machine interfaces of touch and display are applied extensively, and touch display devices are required to be lightweight, compact, and power saving. The touch display panels utilizing the in-cell touch technology are the products developed for meeting the lightweight, compact, and power-saving requirements. Unfortunately, the general problem of in-cell touch display panels is the mutual influence between touch operations and display operations. The general method to overcome the problem is to adopt the time-division multiplexing for dividing touch cycles and display cycles and thus improving the crosstalk between touch and display.

Nonetheless, the time-division multiplexing method cannot solve the parasitic capacitance effect inside touch display panels. The effect can lower the touch detection sensitivity, reduced the display quality, and increase the unnecessary power consumption owing to charging and discharging the parasitic capacitance. The China Patent Publication Numbers CN102609132B and CN105022541B provide solutions for the problem. To solve the problem of parasitic capacitance effect, in general, an active guard signal will be transmitted for enabling the active guard signal applied to both terminals of parasitic capacitance to be identical or approximate to the driving signal Tx used for detecting touches and hence improving the suppression of parasitic capacitance effect. Unfortunately, this solution needs additional capacitors to transmit the active guard signal, leading to an increase in the fabrication cost of touch display devices. In addition, the circuit control becomes more difficult because controlling the active guard signal to be identical or approximate to the driving signal requires high precision, such as the tight demand in phase control.

Accordingly, the present invention provides a touch display driving circuit requiring no additional capacitor for improving the suppression of parasitic capacitance effect, increasing touch detection sensitivity and display quality, and lowering unnecessary power consumption.

SUMMARY

An objective of the present invention is to provide a touch display driving circuit, which comprises one or more current-source for providing one or more current signal in the touch detection cycles and floating the display electrodes of a touch display panel. Thereby, in touch detection cycles, the parasitic capacitance effect between the touch electrodes and the display electrodes of the touch display panel can be reduced. Then the touch sensitivity of the touch display panel can be enhanced, and the unnecessary power consumption can be lowered.

Another objective of the present invention is to provide a touch display driving circuit, which provides one or more current signal using one or more current-source in touch detection cycles for maintaining the average value of the level of the scan signals or source signals output to a touch display panel at a predetermined level. Then the display electrodes of the touch display panel can be kept at a state required for displaying and the influence of touch detection on displaying frames can be lowered.

The present invention discloses a touch display driving circuit, which comprises a gate driving circuit, a source driving circuit, a touch detection circuit, and one or more gate current-source. The gate driving circuit generates a plurality of scan signals. The source driving circuit generates a plurality of source signals. The touch detection circuit generates a driving signal and detects a plurality of sensing signals in a touch detection cycle. The one or more gate current-source is coupled to the gate driving circuit and outputs one or more current signal in the touch detection cycle for maintaining the average value of the level of the plurality of scan signals at a predetermined level.

The present invention further discloses a touch display driving circuit, which comprises a gate driving circuit, a source driving circuit, a touch detection circuit, and a source current-source. The gate driving circuit and the source driving circuit generate a plurality of scan signals and a plurality of source signals, respectively, which are provided to a plurality of scan lines and a plurality of source lines, respectively. The touch detection circuit generates a driving signal and detects a plurality of sensing signals in a touch detection cycle. The source current-source is coupled to the plurality of source lines and outputs a source current signal in the touch detection cycle for maintaining the average value of the level of the plurality of source signals of the plurality of source lines at a predetermined level.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
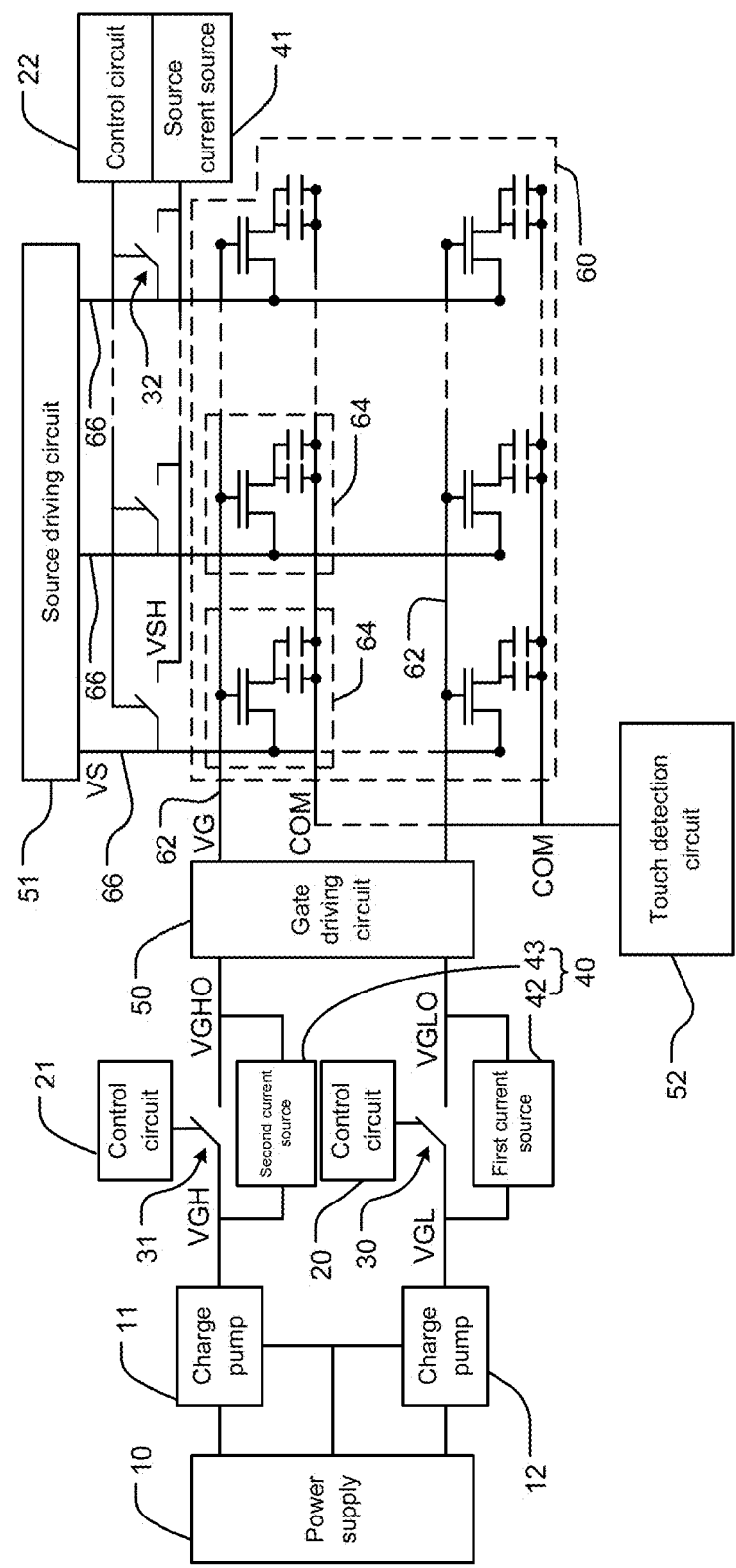
FIG. 1 shows a schematic diagram of the touch display driving circuit according to an embodiment of the present invention.
Figure 2:
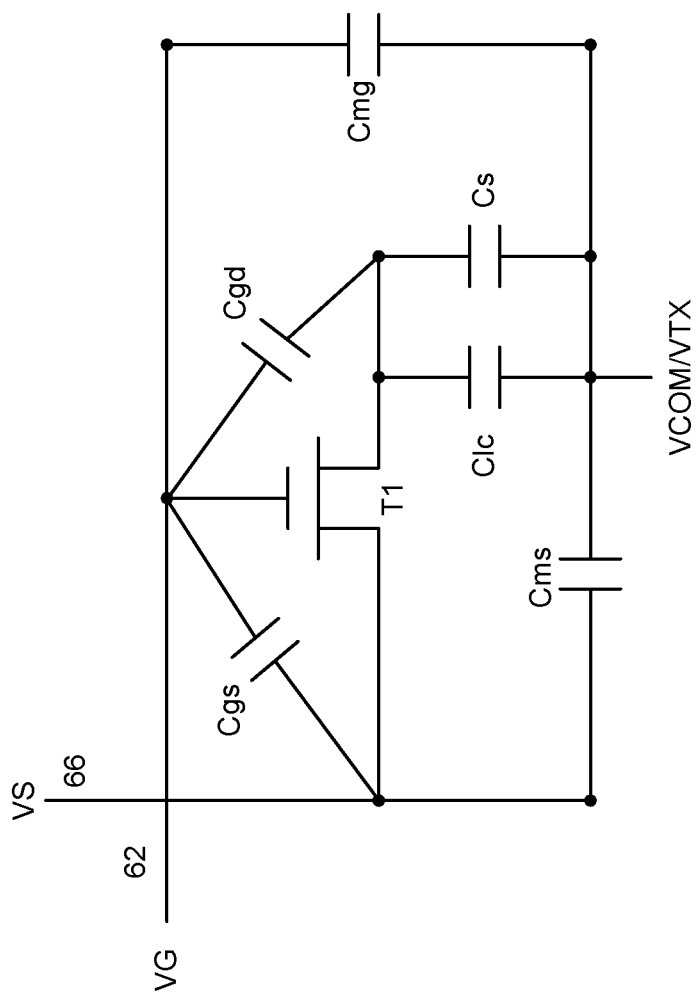
FIG. 2 shows a schematic diagram of the parasitic capacitance of a pixel.

Please refer to FIG. 1, which shows a schematic diagram of the touch display driving circuit according to an embodiment of the present invention. As shown in the figure, the touch display driving circuit is coupled to a touch display panel 60, and can comprise a gate driving circuit 50, a source driving circuit 51, and a touch detection circuit 52. The gate driving circuit 50 is coupled to a plurality of scan lines 62 of the touch display panel 60, and outputs a plurality of scan signals VG to the plurality of scan lines 62 for scanning a plurality of pixels 64 of the touch display panel 60 and controlling the plurality of pixels 64 to receive a plurality of source signals VS output by the source driving circuit 51. The source driving circuit 51 is coupled to a plurality of source lines 66 of the touch display panel 60 for providing the plurality of source signals VS to the plurality of source lines 66. The touch detection circuit 52 is coupled to a common electrode COM of the plurality of pixels 64. In addition to acting as the electrode for the common signal VCOM required for displaying in the display cycles, the common electrode COM acts as a plurality of touch electrodes in the touch detection cycle. The touch detection circuit 52 generates a driving signal Tx in a touch detection cycle to plurality of touch electrodes formed by the common electrode COM of the plurality of pixels 64 for generating a plurality of sensing signals Rx. Besides, the touch detection circuit 52 detects the plurality of sensing signals for detecting the location on the touch display panel 60 touched by a user. Furthermore, in a display cycle, a common signal VCOM, as shown in FIG. 2, is applied to the common electrode COM. According to an embodiment of the present invention, a common signal generating circuit can be adapted to provide the common signal VCOM to the common electrode COM. Nonetheless, the present invention is not limited to the embodiment. Thereby, the gate driving circuit 50, the source driving circuit 51, and the touch detection circuit 52 can drive the touch display panel 60 to display and to detect touches.

Please refer again to FIG. 1. A voltage supply circuit can generate a first voltage VGL (the cutoff voltage) and a second voltage VGH (the scan voltage). The voltage supply circuit can include a power supply 10 and a plurality of charge pumps 11, 12. The power supply 10 is coupled to the plurality of charge pumps 11, 12 and supplies an output voltage to the plurality of charge pumps 11, 12. The plurality of charge pumps 11, 12 generates the first voltage VGL and the second voltage VGH according to the output voltage. The gate driving circuit 50 is coupled to the plurality of charge pumps 11, 12 and generates the plurality of scan signals VG according to the first voltage VGL and the second voltage VGH. The plurality of scan signals VG control transistors in the plurality of pixels 64 to turn on and off, respectively. According to the embodiment of FIG. 1, the gate driving circuit 50 drives the levels of the plurality of scan signals VG to a high level according to the second voltage VGH for turning on the transistors in the plurality of pixels 64, respectively. On the other hand, the gate driving circuit 50 drives the levels of the plurality of scan signals VG to a low level according to the first voltage VGL for turning off the transistors in the plurality of pixels 64, respectively.

In other words, according to the present embodiment, the level of the first voltage VGL is set to lower than the level of the second voltage VGH.

Moreover, the touch display driving circuit of the touch display panel 60 can comprise a control circuit 20, a switching circuit 30, and a gate current-source 40. The control circuit 20 is coupled to the switching circuit 30 and generates a control signal to the switching circuit 30 for controlling the switching circuit to turn on and cut off (open circuit). The switching circuit 30 is coupled between the charge pump 12 and the gate driving circuit 50. Namely, the switching circuit 30 is coupled between the voltage supply circuit and the gate driving circuit 50. The voltage supply circuit supplies the first voltage VGL to the gate driving circuit 50 via the switching circuit 30. In the display cycles, the control circuit 20 controls the switching circuit 30 to short the voltage supply circuit and the gate driving circuit 50 for transmitting the first voltage VGL as a first input voltage VGLO. Then the gate driving circuit 50 uses the first input voltage VGLO to generate the plurality of scan signals VG. According to an embodiment of the present invention, the control circuit 20 can be not required. Instead, the touch detection circuit 52 can control the switching circuit 30 directly.

The gate current-source 40 is a controllable current-source coupled between the charge pump 12 of the voltage supply circuit and the gate driving circuit 50. In the touch detection cycles, the control circuit 20 controls the switching circuit 30 to open the conduction path between the voltage supply circuit and the gate driving circuit 50. The gate current-source 40 generates a current signal to control the average value of the level of the first input voltage VGLO. According to the present embodiment, the gate current-source 40 controls the average value of the level of the first input voltage VGLO to be a predetermined cutoff voltage. Namely, the gate current-source 40 is used for providing the predetermined cutoff voltage. Depending on application requirements, the predetermined cutoff voltage can be identical to or different from the first voltage VGL. Besides, because the gate driving circuit 50 is coupled to the gate current-source 40 and generates the plurality of scan signals VG according to the first input voltage VGLO, when the levels of the plurality of scan signals VG in the touch detection cycles are required to be low, the gate driving circuit 50 can maintain the low levels of the plurality of scan signals VG at a cutoff level according to the predetermined cutoff voltage. Thereby, the average values of the levels of the plurality of scan signals are maintained at a predetermined level. Accordingly, the gate current-source 40 can control the low levels of the plurality of scan signals VG. According to the present embodiment, the gate current-source 40 controls the average value of the level of the first input voltage VGLO to the predetermined cutoff voltage and thus controlling the low levels of the plurality of scan signals VG to the cutoff level. According to the present embodiment, the cutoff level can be the level of the predetermined cutoff voltage.

In the touch detection cycles, the touch detection circuit 52 outputs the driving signal to the common electrode COM (the touch electrode). Due to the parasitic capacitance effect between the common electrode COM and the display electrodes, the levels of the plurality of scan signals VG might be affected by the driving signal. That is to say, the levels of the plurality of scan signals VG might shift from the predetermined level such as the cutoff level. Then the display frames can be disordered. The display electrodes described above can be the electrodes coupled to the gates of the transistors of the pixels 64. To cope with the above problem, the current signal generated by the gate current-source 40 can adjust the level of the first input voltage VGLO. Namely, the first input voltage VGLO can be adjusted to be the predetermined cutoff voltage. Thereby, the average values of the levels of the plurality of scan signals VG can be maintained at the predetermined level. The gate current-source 40 can determine the level of the current signal according to the levels of the plurality of scan signals VG for adjusting the average value of the level of the first input voltage VGLO. In other words, as the average values of the levels of the plurality of scan signals VG are raised owing to the coupling of the driving signal, the gate current-source 40 adjusts the level of the current signal and thus lowering the average value of the level of the first input voltage VGLO. Then the low levels of the plurality of scan signals VG are adjusted to be the cutoff level for avoiding frame disorder caused by the parasitic capacitance effect. Accordingly, the display quality can be maintained.

Please refer again to FIG. 1. Because the gate current-source 40 is a controllable current-source, its output impedance will be huge, making the electrical path(s) (the scan line(s) 62) for transmitting the plurality of scan signals VG in a floating state. Thereby, in the touch detection cycles, the influence of the parasitic capacitance effect between the common electrode COM and the display electrodes on the sensitivity of the touch detection circuit 52 on detecting the plurality of sensing signals can be reduced. In addition, because the electrical path(s) is approximately floating, the charging and discharging currents caused by the parasitic capacitance effect in the plurality of pixels 64 can be decreased and consequently lowering the power consumption. In other words, according to the embodiment, by controlling the average value of the level of the first input voltage VGLO, the direct-current voltage value of the display electrodes can be controlled effectively and thus avoiding the frame disorder phenomenon caused by the parasitic capacitance effect. In addition, by using the property of a current-source, the display electrodes are set in a floating state while confronting alternate-current varying signals. Thereby, the influence of the parasitic capacitance effect between the common electrode COM and the display electrodes on touch detection sensitivity can be reduced effectively. Besides, the power consumption can be lowered as well.

Moreover, according to the above description, the gate current-source 40 can be located only between the charge pump 12 and the gate driving circuit 50. In other words, the control circuit 21, the switching circuit 31, and a second current-source 43 are not disposed between the charge pump 11 and the gate driving circuit 50. Thereby, according to the previous embodiment, the gate current-source 40 can include the control circuit 20, the switching circuit 30, and the first current-source 42 only. In addition, the touch display circuit does not include the control circuit 22, the switching circuit 32, and the source current-source 41.

Contrarily, the control circuit 20, the switching circuit 30, and the gate current-source 40 can be disposed between the charge pump 11 and the gate driving circuit 50 for maintaining the high levels of the plurality of scan signals VG at a scan level in the touch detection cycles. Thereby, in the touch detection cycles, the gate current-source 40 generates the current signal with different levels for adjusting the level of a second input voltage VGHO and making the average value of the level of the second input voltage VGHO become a predetermined scan voltage. Thereby, when the levels of the plurality of scan signals VG are required to be high, the gate driving circuit 50 can maintain the high levels of the plurality of scan signals VG at the scan level according to the predetermined scan voltage. According to the present embodiment, the scan level can be the level of the predetermined scan voltage. Thereby, the gate current-source 40 can be disposed only between the charge pump 11 and the gate driving circuit 50. Namely, the control circuit 20, the switching circuit 30, and the first current-source 42 are not disposed between the charge pump 12 and the gate driving circuit 50. Hence, according to the previous embodiment, the gate current-source 40 can include the control circuit 21, the switching circuit 31, and the second current-source 43 only. The touch display circuit does not include the control circuit 22, the switching circuit 32, and the source current-source 41.

Please refer again to FIG. 1. The control circuit 20, the switching circuit 30, and the gate current-source 40 can be alternatively applied to the source driving circuit side for maintaining the levels of the plurality of source signals VS of the plurality of source lines 66 in the touch detection cycles. The gate current-source 40 is replaced by a source current-source 41. Thereby, the source current-source 41 is coupled to the plurality of source lines 66. Besides, in the touch detection cycles, the source current-source 41 outputs a source current signal for supplying a predetermined source voltage VSH to the plurality of source lines 66. Likewise, the average value of the levels of the plurality of source signals VS is controlled by the predetermined source voltage VSH and becomes a predetermined level. In other words, the predetermined source voltage VSH maintains the average value of the levels of the plurality of source signals VS of the plurality of source lines 66 to the predetermined level.

The switching circuit 30 can be coupled between the source current-source 41 and the plurality of source lines 66. In addition, in the touch detection cycles, the source current-source 41 provides the predetermined source voltage VSH to the plurality of source lines 66 via the switching circuit 30. Alternatively, the switching circuit 30 can be coupled between the source driving circuit 50 and the plurality of source lines 66, and the source driving circuit 50 provides the plurality of source signals VS to the plurality of source lines 66 via the switching circuit 30. Nonetheless, the present invention is not limited to the embodiments. Thereby, the touch display circuit can comprise the control circuit 22, the switching circuit 32, and the source current-source 41 only, but not including the control circuit 20, 21, the switching circuit 30, 31, the first current-source 42, and the second current-source 43.

According to another embodiment, the gate current-source can be disposed between the gate driving circuit 50 and the voltage supply circuit for maintaining the levels of the plurality of scan signals VG at the scan level or the cutoff level. The gate current-source includes a first current-source 42 and a second current-source 43. The technical content of the first current-source 42 is identical to the gate current-source 40 according to the above embodiment. The first current-source 42 is used for adjusting the first input voltage VGLO. Namely, in the touch detection cycles, the first current-source 42 outputs a first current signal for adjusting the first input voltage VGLO to become the cutoff voltage. Thereby, the gate driving circuit 50 maintains the low levels of the plurality of scan signals VG at the cutoff level according to the first input voltage VGLO.

The technical content of the second current-source 43 is identical to the gate current-source 40. The second current-source 43 is used for adjusting the second input voltage VGHO. Namely, in the touch detection cycles, the second current-source 43 outputs a second current signal for adjusting the second input voltage VGHO to become the scan voltage. Thereby, the gate driving circuit 50 maintains the high levels of the plurality of scan signals VG at the scan level according to the second input voltage VGHO. The rest technical contents are identical to the description for the embodiment in FIG. 1. Hence, the details will not be described again.

Furthermore, in addition to maintaining the levels of the plurality of scan signals VG, according to an embodiment, the source current-source 41 can be included for maintaining the voltage levels of the plurality of source lines 66. Namely, in the touch detection cycles, the source current-source 41 outputs the source current signal and thus providing the predetermined source voltage VSH to the plurality of source lines 66. Thereby, the predetermined source voltage VSH maintains the average value of the levels of the plurality of source signals VS of the plurality of source lines 66 at the predetermined level. Besides, the switching circuit can include a plurality of switches 30, 31, 32.

Please refer to FIG. 2, which shows a schematic diagram of the parasitic capacitance of a pixel. As shown in the figure, a parasitic capacitance Cgs is located between a gate and a source of a transistor T1 of the pixel. The gate and source of the transistor T1 are coupled to the scan line 62 and the source line 66, respectively. A parasitic capacitance Cgd is located between the gate and a drain of the transistor T1. A liquid-crystal capacitance Clc and a storage capacitor Cs are coupled between the drain and the common electrode COM. A parasitic capacitance Cmg is located between the common electrode COM and the gate (the scan line 62) of the transistor T1. A parasitic capacitance Cms is located between the common electrode COM and the source (the source line 66) of the transistor T1. For the architecture of the touch display driving circuit without the gate current-source 40 according to the present invention, in the touch detection cycles, when the touch detection circuit 52 outputs the driving signal to the common electrode COM, the driving signal will be coupled to the gate of the transistor T1 through the parasitic capacitance Cmg and other capacitances on the other paths and hence influencing the level of the scan signal VG. For the common electrode COM, the level of the scan signal VG is a reference voltage level (equivalent to the ground level). Thereby, the driving signal will charge and discharge the parasitic capacitance Cmg and other capacitances on the other paths. Then the variations of the levels of the plurality of sensing signals between the conditions when a user touches or does not touch the display panel 60 are not significant. Consequently, it will be difficult to detect the variations of the levels of the sensing signals. That is to say, the coupling effect of parasitic capacitances lowers the touch detection sensitivity of the touch detection circuit 52. In addition, unnecessary power consumption due to charging and discharging will occur. Likewise, the coupling effect of parasitic capacitance occurs between the source of the transistor T1 and the common electrode COM and lowers the touch detection sensitivity of the touch detection circuit 52. Besides, there will be unnecessary power consumption due to charging and discharging on the path of the parasitic capacitance Cms.

Figure 3:
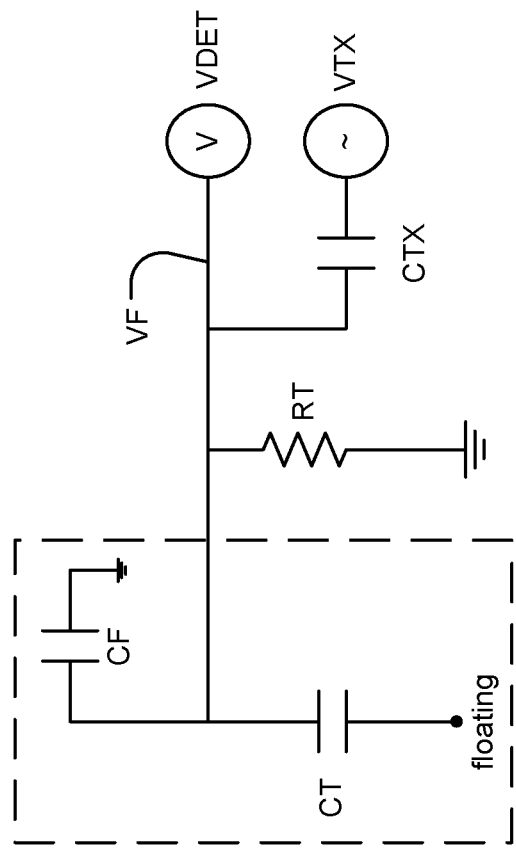
FIG. 3 shows an equivalent circuit diagram of the touch display panel driven by the touch display driving circuit and touched by a user according to the present invention.

Accordingly, the present invention uses the gate current-source 40 to make the gate of the transistor T1 floating with respect to the common electrode COM for improving the influence of the driving signal on the levels of the plurality of scan signals VG as well as enhancing the touch detection sensitivity of the touch detection circuit 52. The equivalent capacitance CT of the plurality of parasitic capacitances Cgs, Cgd, Cms, Cmg in FIG. 2 is shown in FIG. 3, which shows an equivalent circuit diagram of the touch display panel driven by the touch display driving circuit and touched by a user according to the present invention. As shown in the figure, CT is the equivalent capacitance of all of the above parasitic capacitances and RT is the equivalent resistance inside the touch detection circuit 52. In addition, one terminal (the display electrode) of the equivalent capacitance CT is floating owing to the gate current-source 40. The other terminal of the equivalent capacitance CT can be coupled to the driving signal (VTX according to the present embodiment) via a transmission capacitance CTX. Then in the touch detection cycles and when an object such as a finger touches the touch display panel 60, a capacitance CF exists, lowering the level of a signal VF. Consequently, the sensing signal (VDET according to the present embodiment) detected by the touch detection circuit 52 will be lowered as the level of the signal VF is reduced.

Figure 4:
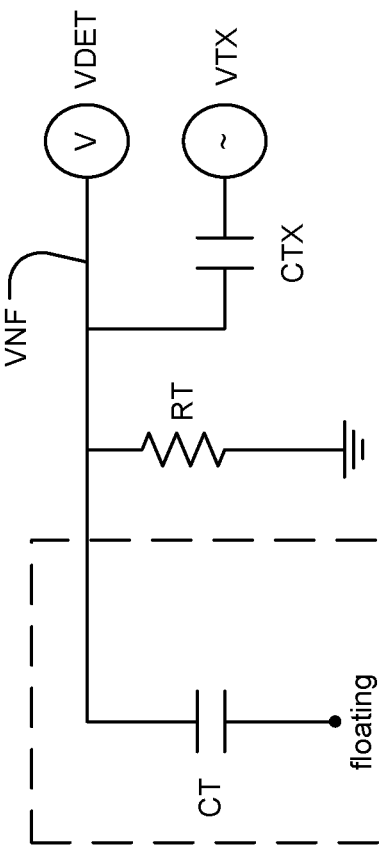
FIG. 4 shows an equivalent circuit diagram of the touch display panel driven by the touch display driving circuit and not touched by a user according to the present invention.

Please refer to FIG. 4, which shows an equivalent circuit diagram of the touch display panel driven by the touch display driving circuit and not touched by a user according to the present invention. As shown in the figure, when the object does not touch the touch display panel 60, the capacitance CF will not exist in the equivalent circuit. Thereby, the level of a signal VNF will still approximate to the level of the driving signal VTX. The level of the sensing signal VDET as detected by the touch detection circuit 52 indicates that no object touches the touch display panel 60.

Figure 5:
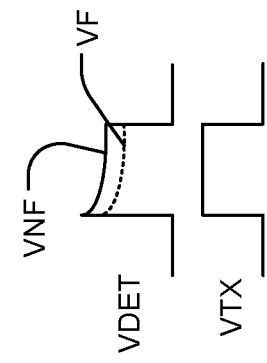
FIG. 5 shows waveforms of the driving signal and the sensing signal according to an embodiment of the present invention.

Please refer to FIG. 5, which shows waveforms of the driving signal and the sensing signal according to an embodiment of the present invention. As shown in the figure, as no object touches the touch display panel 60, the level of the sensing signal VDET is higher than the level of the sensing signal VDET when the object touches the touch display panel 60. The driving signal VTX can be a square wave, as shown in FIG. 5. Alternatively, the driving signal VTX can be a sine wave or other sensing waveforms. According to the present invention, it is not limited to a square wave.

Figure 6:
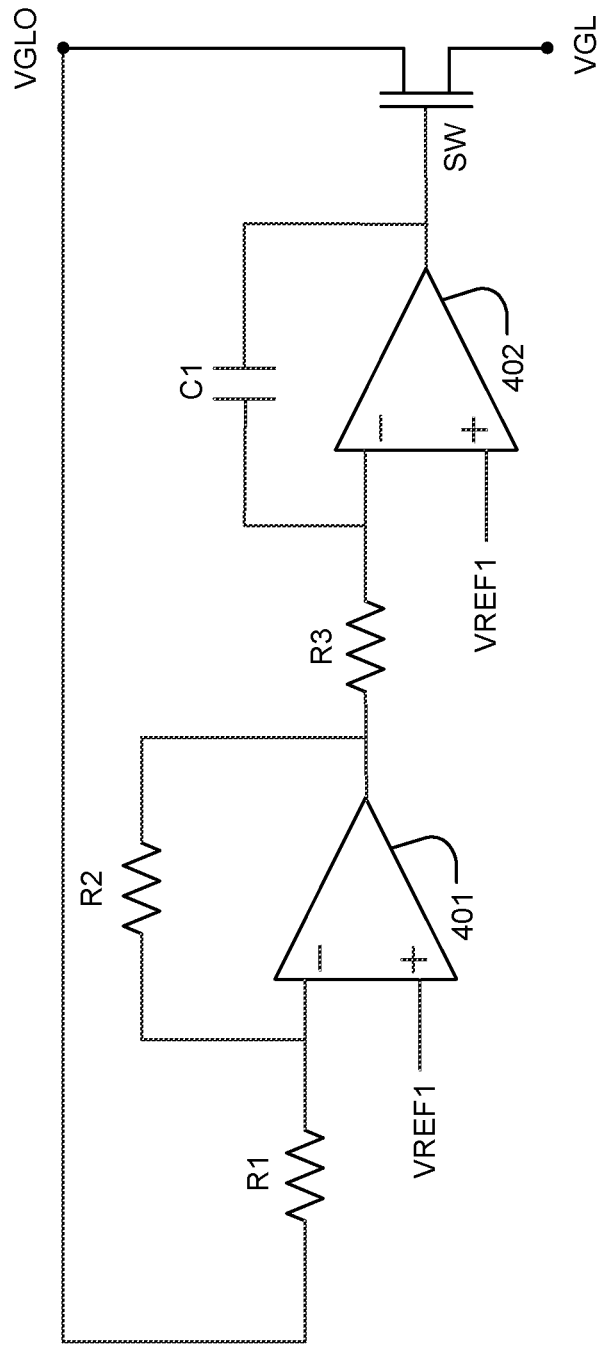
FIG. 6 shows a circuit diagram of the gate current-source according to an embodiment of the present invention.

Please refer to FIG. 6, which shows a circuit diagram of the gate current-source according to an embodiment of the present invention. As shown in the figure, according to the first embodiment, the gate current-source 40 is a controllable current-source and can include a low-pass filter circuit and a switch SW. According to the present embodiment, the low-pass filter circuit of the gate current-source 40 includes a plurality of comparators 401, 402, a plurality of resistors R1, R2, R3, and a capacitor C1. The positive input terminals of the plurality of comparators 401, 402 are coupled to a reference signal VREF1, respectively. The reference signal VREF1 is related to the predetermined cutoff voltage to be set. A negative input terminal of the comparator 401 is coupled to the gate driving circuit 50 via the resistor R1 and receives the first input voltage VGLO. An output terminal of the comparator 401 is coupled to a negative input terminal of the comparator 402 via the resistor R3. The resistor R2 is coupled between the negative input terminal and the output terminal of the comparator 401. The capacitor C1 is coupled between the negative input terminal and the output terminal of the comparator 402. Thereby, the low-pass filter circuit generates a control signal according to the first input voltage VGLO. The switch SW is coupled to the low-pass filter circuit and receives the control signal. Both terminals of the switch SW are coupled to the first voltage VGL and the first input voltage VGLO, respectively. The control signal controls the conduction state of the switch SW. Hence, the current signal generated by the gate current-source 40 is generated according to the conduction state of the switch SW and the first voltage VGL. Besides, the current signal means the current passing through the switch SW of the conduction state.

Figure 7:
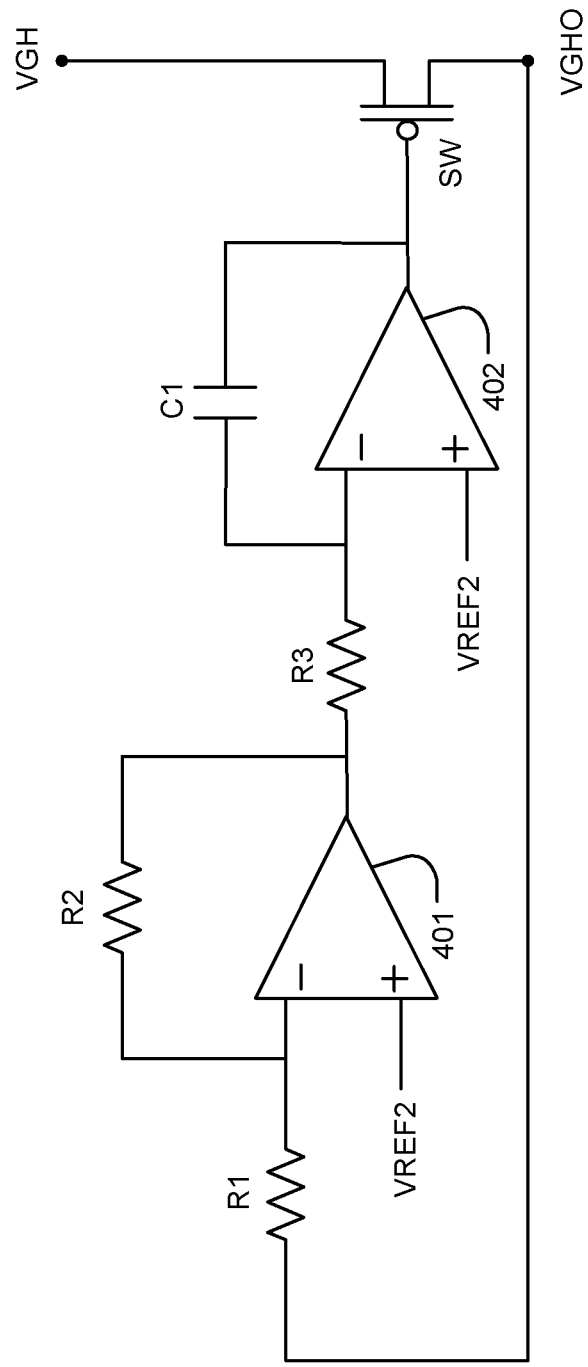
FIG. 7 shows a circuit diagram of the gate current-source according to another embodiment of the present invention.

Please refer to FIG. 7, which shows a circuit diagram of the gate current-source according to another embodiment of the present invention. As shown in the figure, likewise, the gate current-source 40 in FIG. 1 can be a controllable current-source. Both terminals of the switch SW are now coupled to the second voltage VGH and the second input voltage VGHO. The reference signal VREF1 shown in FIG. 6 can now be changed to another reference signal VREF2 according to requirements. The reference signal VREF2 is related to the predetermined scan voltage to be set. The negative input terminal of the comparator 401 is coupled to the gate driving circuit 50 via the resistor R1 for receiving the second input voltage VGHO. The rest circuit and operations are identical to the gate current-source 40 shown in FIG. 6. Hence, the details will not be described again.

To sum up, the present invention discloses a touch display driving circuit, which comprises a gate driving circuit, a source driving circuit, a touch detection circuit, and one or more gate current-source. The gate driving circuit generates a plurality of scan signals. The source driving circuit generates a plurality of source signals. The touch detection circuit generates a driving signal and detects a plurality of sensing signals in a touch detection cycle. The one or more gate current-source is coupled to the gate driving circuit and outputs one or more current signal in the touch detection cycle for maintaining the average value of the level of the plurality of scan signals at a predetermined level. Then the display electrodes of a touch display panel can be kept at a state required for displaying and the influence of touch detection on displaying frames can be lowered. In addition, by using the gate current-source to provide the current signal, the display electrodes of the touch display panel are floating. Thereby, in touch detection cycles, the parasitic capacitance effect between the touch electrodes and the display electrodes of the touch display panel can be reduced. Then the touch sensitivity of the touch display panel can be enhanced, and the unnecessary power consumption can be lowered.

According to another embodiment of the present invention, a touch display driving circuit comprises a gate driving circuit, a source driving circuit, a touch detection circuit, and a source current-source. The source current-source is coupled to a plurality of source lines and outputs a source current signal in the touch detection cycle for maintaining the level of the plurality of source signals of the plurality of source lines at a predetermined level. Then the display electrodes of the touch display panel can be kept at a state required for displaying and the influence of touch detection on displaying frames can be lowered.

What is claimed is:

1. A touch display driving circuit, comprising:
    a gate driving circuit, generating a plurality of scan signals;
    a source driving circuit, generating a plurality of source signals;
    a touch detection circuit, generating a driving signal and detecting a plurality of sensing signals in a touch detection period;
    one or more gate current-source, coupled to said gate driving circuit, and outputting one or more current signal according to the levels of said plurality of scan signals in said touch detection period for maintaining the average value of the level of said plurality of scan signals at a predetermined level; and
    a voltage supply circuit, producing a first voltage and a second voltage in a display period, and said first voltage lower than said second voltage, said gate driving circuit generating said plurality of scan signals according to said first voltage and said second voltage;
    wherein while said one or more gate current-source is outputting said one or more current signal according to the levels of said plurality of scan signals, the output impedance of said one or more gate current-source is huge to increase the impedance of the electrical path transmitting said plurality of scan signals.

2. The touch display driving circuit of claim 1, wherein said one or more gate current-source includes a first current-source; said first current-source outputs a first current signal for adjusting the level of a first input voltage received by said gate driving circuit to a predetermined cutoff voltage in said touch detection period for controlling the average value of the level of said first input voltage received by said gate driving circuit to said predetermined cutoff voltage; and the levels of said plurality of scan signals are controlled at a cutoff level according to said predetermined cutoff voltage.

3. The touch display driving circuit of claim 1 or 2, wherein said one or more gate current-source further includes a second current-source; said second current-source outputs a second current signal in said touch detection period for controlling the average value of the level of a second input voltage received by said gate driving circuit to a predetermined scan voltage;
    and said gate driving circuit maintains the levels of said plurality of scan signals at a scan level according to said predetermined scan voltage.

4. The touch display driving circuit of claim 3, and further comprising a source current-source, coupled to a plurality of source lines, outputting a source current signal in said touch detection period for providing a predetermined source voltage to said plurality of source lines, and said predetermined source voltage maintaining the average value of the levels of said plurality of source signals of said plurality of source lines at another predetermined level.

5. The touch display driving circuit of claim 1, and further comprising a source current-source, coupled to a plurality of source lines, outputting a source current signal in said touch detection period for providing a predetermined source voltage to said plurality of source lines, and said predetermined source voltage maintaining the average value of the levels of said plurality of source signals of said plurality of source lines at another predetermined level.

6. The touch display driving circuit of claim 5, and further comprising a switching circuit, coupled between said source current-source and said plurality of source lines, and said source current-source providing said predetermined source voltage to said plurality of source lines via said switching circuit in said touch detection period.

7. The touch display driving circuit of claim 1, and further comprising:
    a switching circuit, coupled between said voltage supply circuit and said gate driving circuit;
    where said voltage supply circuit provides said first voltage or/and said second voltage to said gate driving circuit via said switching circuit in said display period; and in said touch detection period, said switching circuit opens a conduction path between said voltage supply circuit and said gate driving circuit, and said one or more gate current-source outputs said one or more current signal for maintaining the average value of the levels of said plurality of scan signals at said predetermined level.

8. The touch display driving circuit of claim 1, wherein said gate current-source includes:
   a low-pass filter circuit, coupled to said gate driving circuit, and generating a control signal according to the level of said scan signal; and
   a switch, coupled to said low-pass filter circuit and coupled to a voltage, said control signal controlling the conduction state of said switch, and said current signal generated according to the conduction state of said switch and said voltage.

9. A touch display driving circuit, comprising:
   a gate driving circuit, generating a plurality of scan signals, and providing said plurality of scan signals to a plurality of scan lines;
   a source driving circuit, generating a plurality of source signals in a display period, and providing said plurality of source signals to a plurality of source lines;
   a touch detection circuit, generating a driving signal and detecting a plurality of sensing signals in a touch detection period;
   a source current-source, coupled to said plurality of source lines, and outputting a source current signal according to the levels of said plurality of source signals of said plurality of source lines in said touch detection period for maintaining the average value of the level of said plurality of source signals of said plurality of source lines at a predetermined level; and
   a voltage supply circuit, producing a first voltage and a second voltage in said display period, and said first voltage lower than said second voltage, said gate driving circuit generating said plurality of scan signals according to said first voltage and said second voltage;
   wherein while said source current-source is outputting said source current signal according to the levels of said plurality of source signals of said plurality of source lines, the output impedance of said source current-source is huge to increase the impedance of the electrical path transmitting said plurality of source signals.

10. The touch display driving circuit of claim 9, wherein a predetermined source voltage is provided to said plurality of source lines according to said source current signal outputted from said source current source according to the levels of said plurality of source signals of said plurality of source lines in said touch detection period; and said predetermined source voltage maintains the average value of the levels of said plurality of source signals of said plurality of source lines at said predetermined level.

11. The touch display driving circuit of claim 10, and further comprising a switching circuit, coupled between said source current-source and said plurality of source lines, and said source current-source providing said predetermined source voltage to said plurality of source lines via said switching circuit in said touch detection period.

* * * * *